(12) United States Patent
Fina

(10) Patent No.: US 12,066,571 B2
(45) Date of Patent: Aug. 20, 2024

(54) METHODS AND SYSTEMS FOR DETECTING ADVERSE ROAD CONDITIONS USING RADAR

(71) Applicant: Waymo LLC, Mountain View, CA (US)

(72) Inventor: Michael Fina, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 270 days.

(21) Appl. No.: 17/246,831

(22) Filed: May 3, 2021

(65) Prior Publication Data

US 2022/0349996 A1    Nov. 3, 2022

(51) Int. Cl.
*G01S 7/41* (2006.01)
*B60W 30/09* (2012.01)
(Continued)

(52) U.S. Cl.
CPC ............. *G01S 7/412* (2013.01); *B60W 30/09* (2013.01); *B60W 30/18163* (2013.01);
(Continued)

(58) Field of Classification Search
CPC ................... G01S 7/412; G01S 13/931; G01S 2013/9318; G01S 2013/9322;
(Continued)

(56) References Cited

U.S. PATENT DOCUMENTS 6,690,316 B2    2/2004   Yankielun
9,097,800 B1    8/2015   Zhu
(Continued)

FOREIGN PATENT DOCUMENTS

CN    108922188 A    11/2018
EP       3511735 B1     3/2021
(Continued)

OTHER PUBLICATIONS

"Vehicle Detection With Automotive Radar Using Deep Learning on Range-Azimuth-Doppler Tensors"; Bence Major, et al; Proceedings of the IEEE/CVF International Conference on Computer Vision (Year: 2019).*
(Continued)

*Primary Examiner* — Maceeh Anwari
(74) *Attorney, Agent, or Firm* — McDonnell Boehnen Hulbert & Berghoff LLP

(57) ABSTRACT

Example embodiments relate to techniques for detecting adverse road conditions using radar. A computing device may generate a first radar representation that represents a field of view for a radar unit coupled to a vehicle and during clear weather conditions and store the first radar representation in memory. The computing device may receive radar data from the radar unit during navigation of the vehicle on a road and determine a second radar representation based on the radar data. The computing device may also perform a comparison between the first radar representation and the second radar representation and determine a road condition for the road based on the comparison. The road condition may represent a quantity of precipitation located on the road and provide control instructions to the vehicle based on the road condition for the road.

20 Claims, 11 Drawing Sheets

(51) Int. Cl.
*B60W 30/18* (2012.01)
*B60W 60/00* (2020.01)
*G01C 21/00* (2006.01)
*G01S 13/931* (2020.01)

(52) U.S. Cl.
CPC ..... *B60W 60/0016* (2020.02); *G01C 21/3844* (2020.08); *G01S 13/931* (2013.01); *B60W 2420/408* (2024.01); *G01S 2013/9318* (2020.01); *G01S 2013/9322* (2020.01)

(58) Field of Classification Search
CPC ... G01S 2013/9316; G01S 2013/93271; G01S 2013/93272; G01S 2013/93275; G01S 7/2927; G01S 7/4091; G01S 7/415; G01S 13/04; G01S 13/582; G01S 13/87; B60W 30/09; B60W 30/18163; B60W 60/0016; B60W 2420/52; G01C 21/3844; Y02A 90/10
USPC .......................................................... 701/23
See application file for complete search history.

(56) References Cited

U.S. PATENT DOCUMENTS

| | | | |
|---|---|---|---|
| 9,116,241 | B2 | 8/2015 | Bechler |
| 9,207,323 | B2 | 12/2015 | Zhu |
| 9,701,292 | B2* | 7/2017 | Fairgrieve ............... B60K 31/04 |
| 9,746,549 | B1* | 8/2017 | Parker ...................... G01S 7/292 |
| 9,921,307 | B2 | 3/2018 | Schmalenberg |
| 10,126,722 | B2 | 11/2018 | Sweet |
| 10,338,594 | B2 | 7/2019 | Long |
| 10,353,053 | B2 | 7/2019 | Rohani |
| 10,745,004 | B2 | 8/2020 | Ichikawa |
| 10,746,867 | B2 | 8/2020 | Stanley |
| 2007/0225914 | A1* | 9/2007 | Kawazoe ............. B62D 15/025 340/436 |
| 2010/0309041 | A1* | 12/2010 | Hassen .................... G01S 7/411 342/26 R |
| 2011/0267219 | A1* | 11/2011 | Kisliansky ............ G01S 13/426 342/159 |
| 2016/0071418 | A1* | 3/2016 | Oshida .................... B60K 28/06 701/23 |
| 2017/0176641 | A1* | 6/2017 | Zhu ....................... G05D 1/0088 |
| 2018/0079424 | A1* | 3/2018 | Myers ..................... G07C 5/008 |
| 2018/0113209 | A1 | 4/2018 | Campbell |
| 2019/0219691 | A1 | 7/2019 | Meehan |
| 2019/0277962 | A1* | 9/2019 | Ingram ................. G01S 13/865 |
| 2019/0339416 | A1 | 11/2019 | Elkabetz |
| 2020/0079381 | A1 | 3/2020 | Lombrozo |
| 2020/0116857 | A1* | 4/2020 | Flores Tapia ........... B60S 1/023 |
| 2020/0406897 | A1 | 12/2020 | Hartmann |
| 2021/0018611 | A1 | 1/2021 | Chhabra |
| 2021/0139050 | A1* | 5/2021 | Fujita .................... B60W 10/18 |
| 2022/0032946 | A1* | 2/2022 | Zhao ....................... G06F 18/24 |

FOREIGN PATENT DOCUMENTS

| | | |
|---|---|---|
| WO | 2014108889 A1 | 7/2014 |
| WO | 2020242945 A1 | 12/2020 |

OTHER PUBLICATIONS

Cornick et al., Localizing Ground Penetrating RADAR: A Step Toward Robust Autonomous Ground Vehicle Localization, Journal of Field Robotics, vol. 33, No. 1, pp. 82-102 Publication Date: 2016, https://onlinelibrary.wiley.com/doi/full/10.1002/rob.21605, retrieved May 3, 2021.

Mohammed et al., "The Perception System of Intelligent Ground Vehicles in All Weather Conditions: A Systematic Literature Review", Sensors 2020, vol. 20, 6532.Publication Date: Nov. 15, 2020, https://www.mdpi.com/1424-8220/20/22/6532/pdf, retrieved May 3, 2021.

* cited by examiner

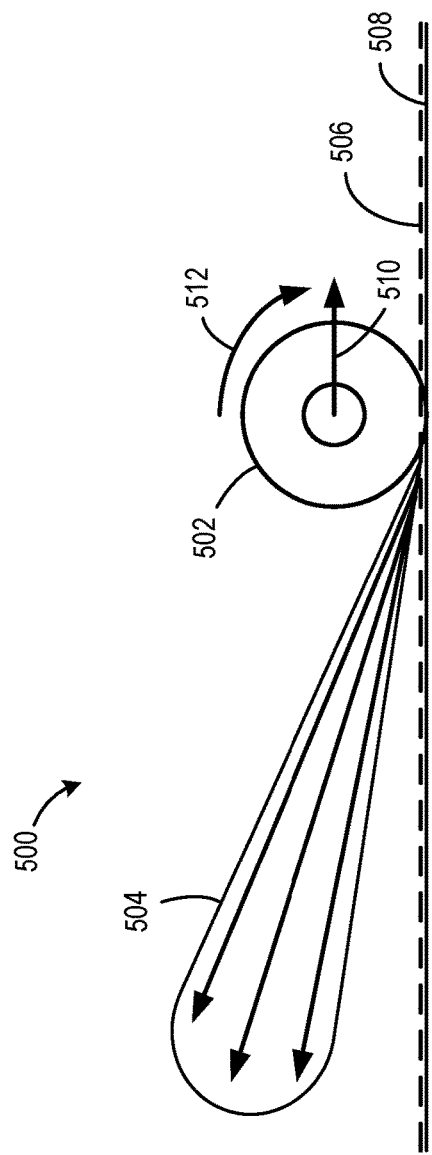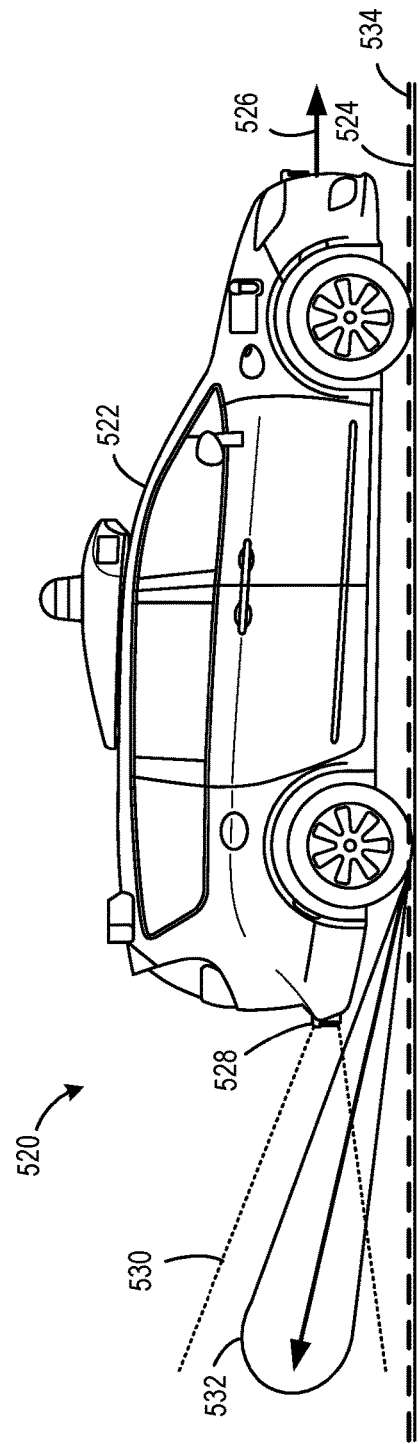

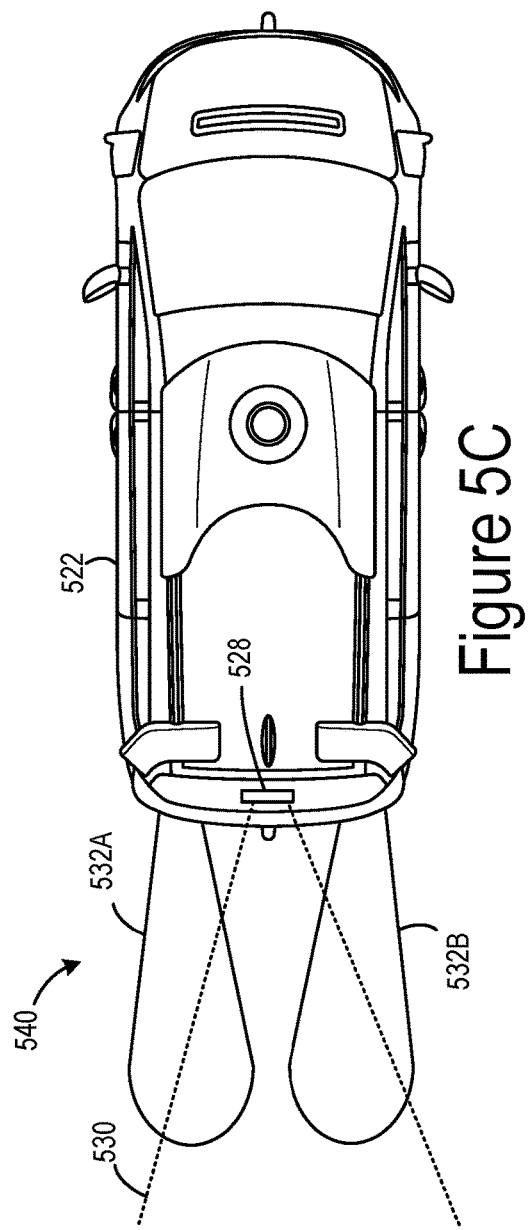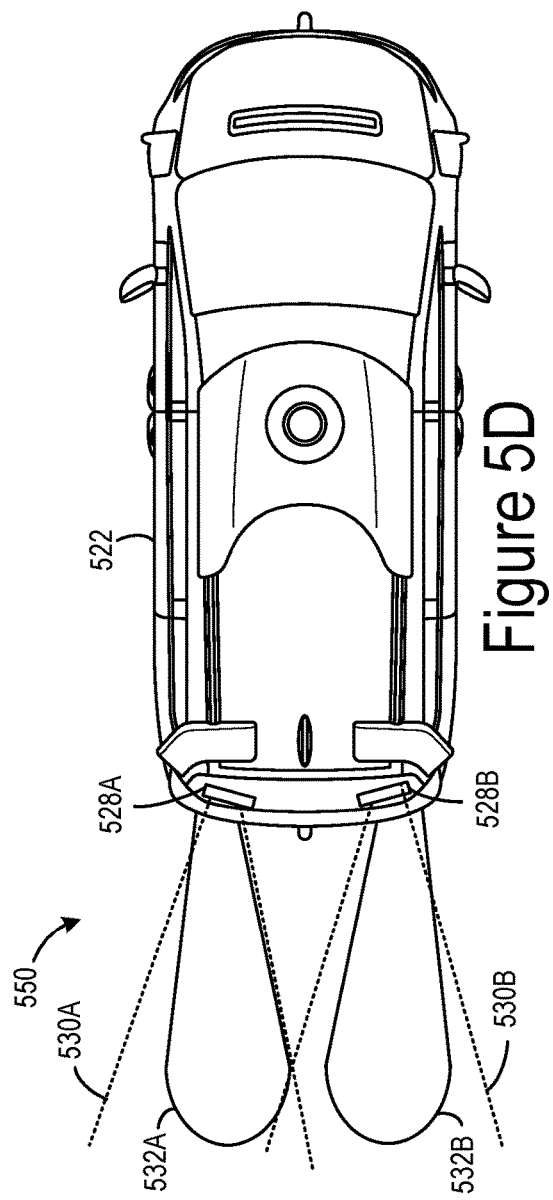

METHODS AND SYSTEMS FOR DETECTING ADVERSE ROAD CONDITIONS USING RADAR

BACKGROUND

Radio detection and ranging systems ("radar systems") are used to estimate distances to environmental features by emitting radio signals and detecting returning reflected signals. Distances to radio-reflective features in the environment can then be determined according to the time delay between transmission and reception. A radar system can emit a signal that varies in frequency over time, such as a signal with a time-varying frequency ramp, and then relate the difference in frequency between the emitted signal and the reflected signal to a range estimate. Some radar systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information can allow for the surrounding environment features to be mapped.

SUMMARY

Example embodiments describe techniques for detecting adverse road conditions in real-time using radar. Radar measurements captured by a vehicle radar system during navigation can be compared to radar data obtained from the same radar unit during clear conditions to detect when adverse road conditions are present, such as rain or snow that can impact the vehicle's navigation. When the radar measurements detect road spray being kicked up by the vehicle's wheels, a control system may adjust vehicle operations to safely navigate the detected adverse road conditions. Adverse road conditions can be communicated to other vehicles to increase safe navigation across a fleet of vehicles.

In one aspect, an example method is provided. The method involves generating a first radar representation that represents a field of view for a radar unit during clear weather conditions. The radar unit is coupled to an external surface of a vehicle. The method further involves storing the first radar representation in memory and receiving, at the computing device, radar data from the radar unit during navigation of the vehicle on a road. The method also involves determining, by the computing device, a second radar representation based on the radar data and performing, by the computing device, a comparison between the first radar representation and the second radar representation. The method also involves determining a road condition for the road. The road condition represents a quantity of precipitation located on the road based on the comparison. The method further involves providing control instructions to the vehicle based on the road condition for the road.

In another aspect, an example system is provided. The system includes a radar unit coupled to a vehicle and a computing device. The computing device is configured to generate a first radar representation that represents a field of view for the radar unit during clear weather conditions and configured to store the first radar representation in memory. The computing device is also configured to receive radar data from the radar unit during navigation of the vehicle on a road and configured to determine a second radar representation based on the radar data. The computing device is also configured to perform a comparison between the first radar representation and the second radar representation and configured to determine a road condition for the road based on the comparison. The road condition represents a quantity of precipitation located on the road. The computing device is further configured to provide control instructions to the vehicle based on the road condition for the road.

In yet another example, an example non-transitory computer-readable medium configured to store instructions, that when executed by a computing system comprising one or more processors, causes the computing system to perform operations. The operations involve generating a first radar representation that represents a field of view for a radar unit during clear weather conditions. The radar unit is coupled to an external surface of a vehicle. The operations also involve storing the first radar representation in memory and receiving radar data from the radar unit during navigation of the vehicle on a road. The operations further involve determining a second radar representation based on the radar data and performing a comparison between the first radar representation and the second radar representation. The operations also involve determining a road condition for the road based on the comparison. The road condition represents a quantity of precipitation located on the road. The operations also involve providing control instructions to the vehicle based on the road condition for the road.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5A illustrates a wheel generating road spray during forward motion, according to one or more example embodiments.

FIG. 5B shows a side view of a vehicle using a rear-facing radar unit to detect road spray, according to one or more example embodiments.

FIG. 5C illustrates a top view of the vehicle using the rear-facing radar unit to detect road spray, according to one or more example embodiments.

FIG. 5D illustrates a top view of the vehicle using multiple radar units to detect road spray, according to one or more example embodiments.

DETAILED DESCRIPTION

Figure 1:
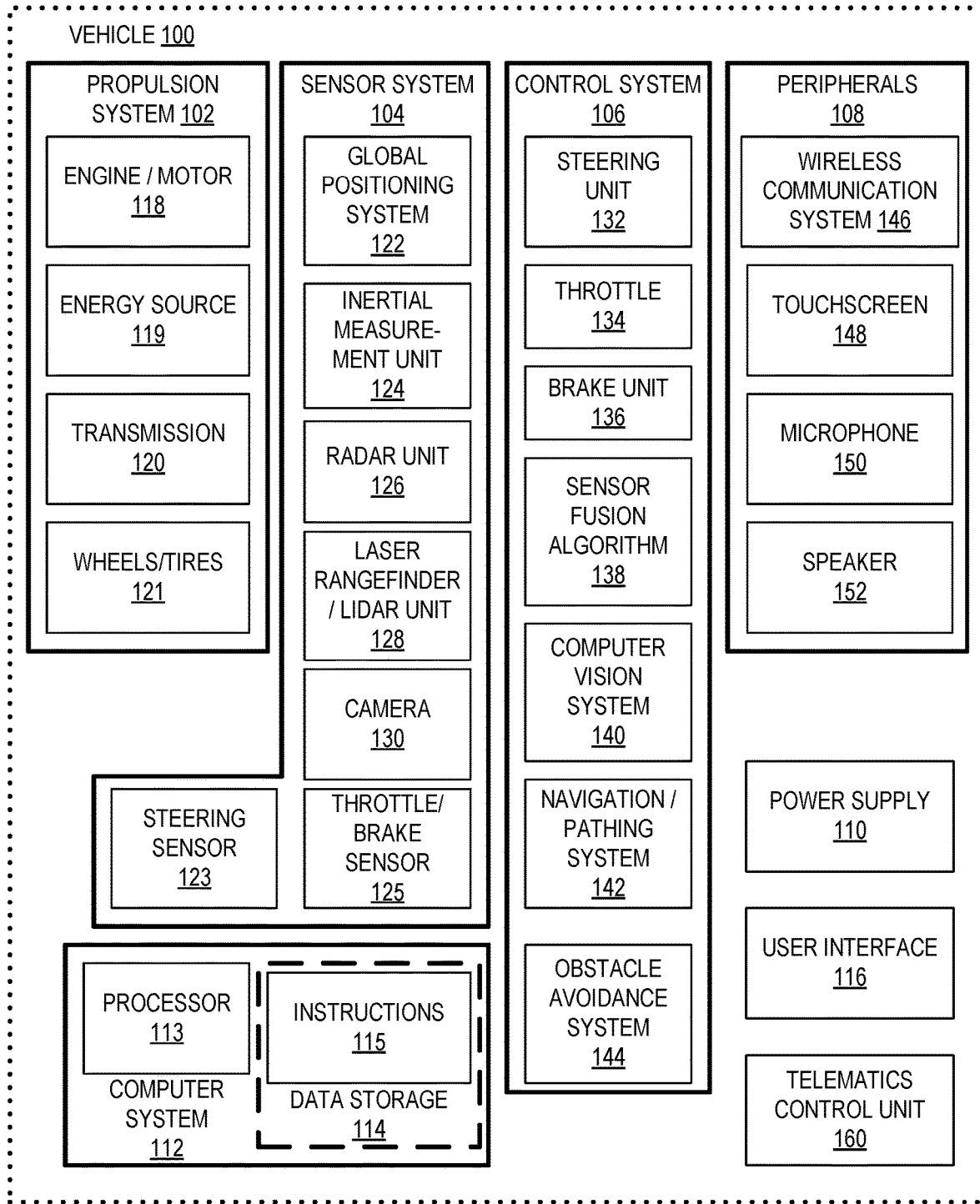
FIG. 1 is a functional block diagram illustrating a vehicle, according to one or more example embodiments.
Figure 2A:
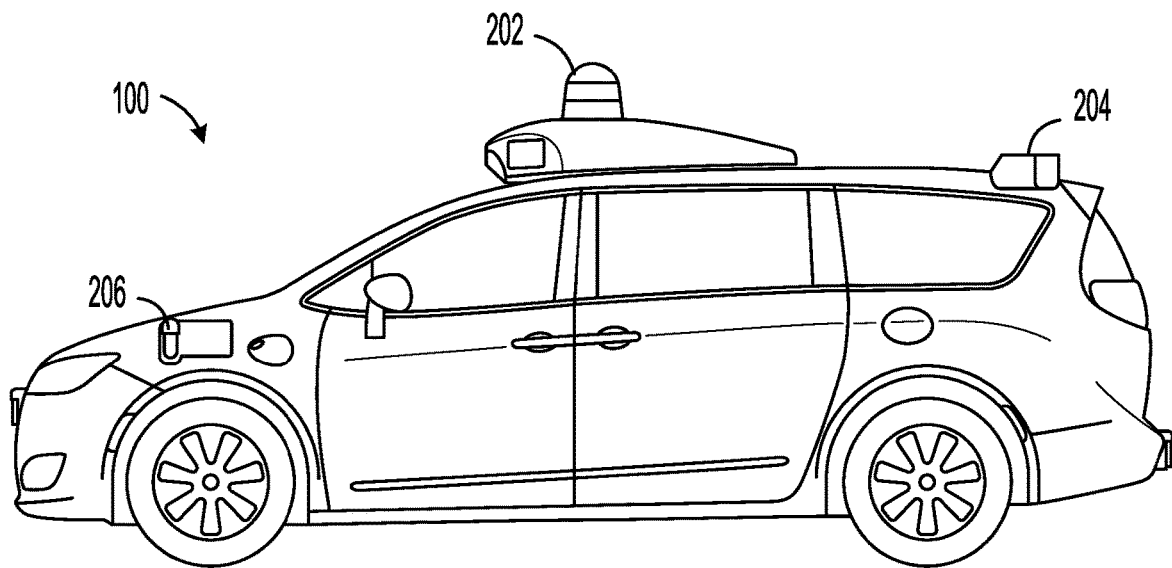
FIG. 2A illustrates a side view of a vehicle, according to one or more example embodiments.
Figure 2B:
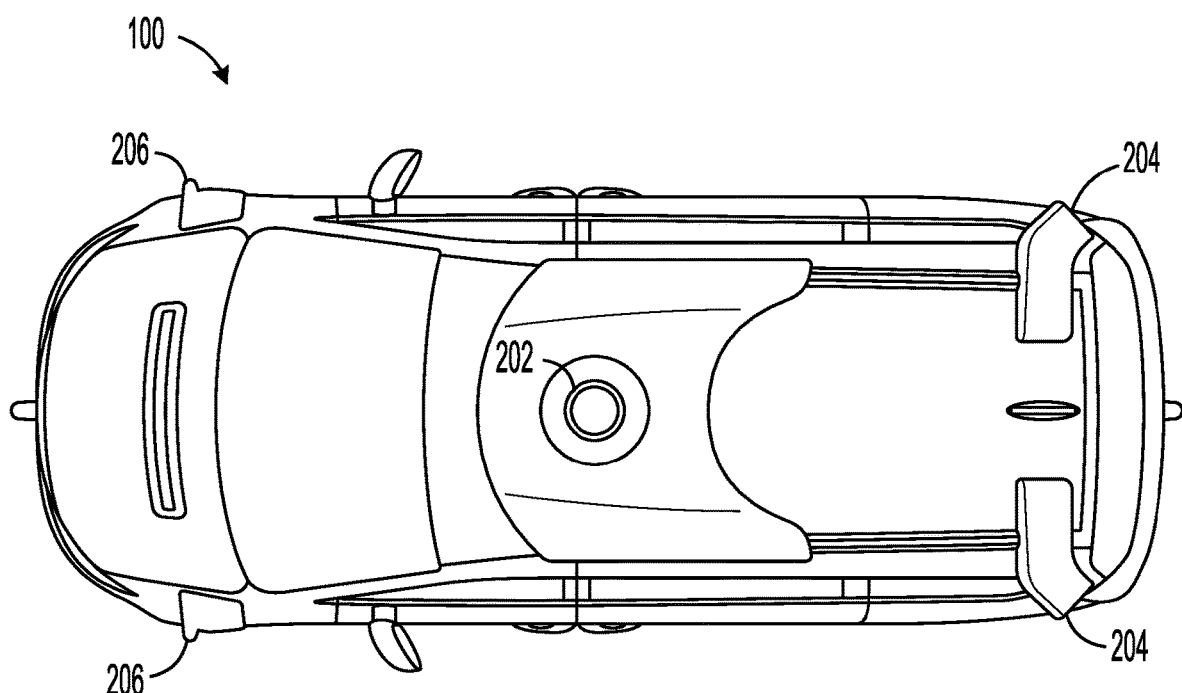
FIG. 2B illustrates a top view of a vehicle, according to one or more example embodiments.
Figure 2C:
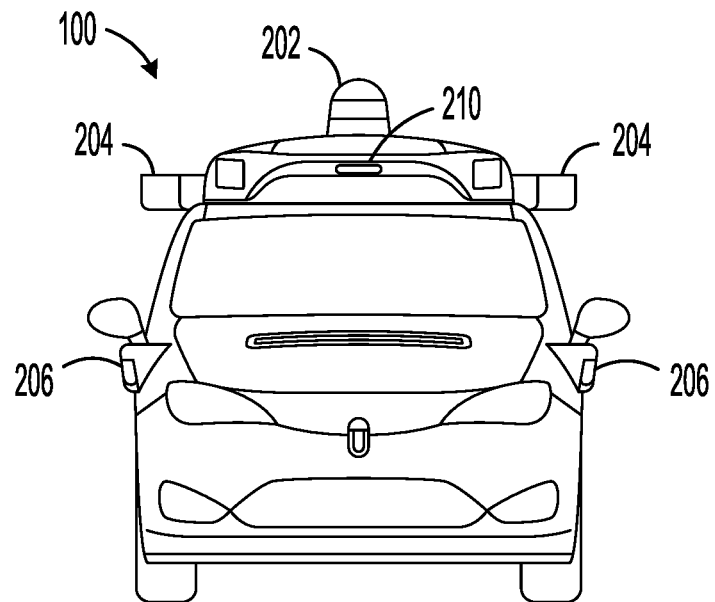
FIG. 2C illustrates a front view of a vehicle, according to one or more example embodiments.
Figure 2D:
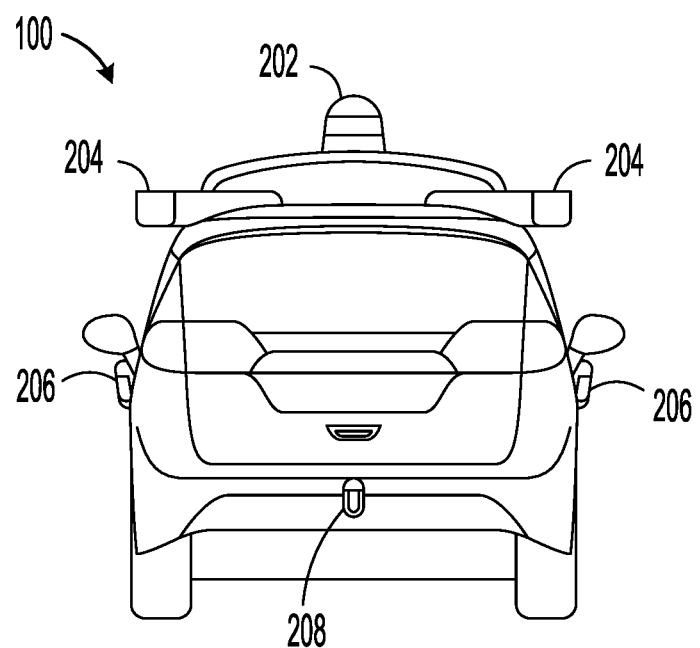
FIG. 2D illustrates a back view of a vehicle, according to one or more example embodiments.
Figure 2E:
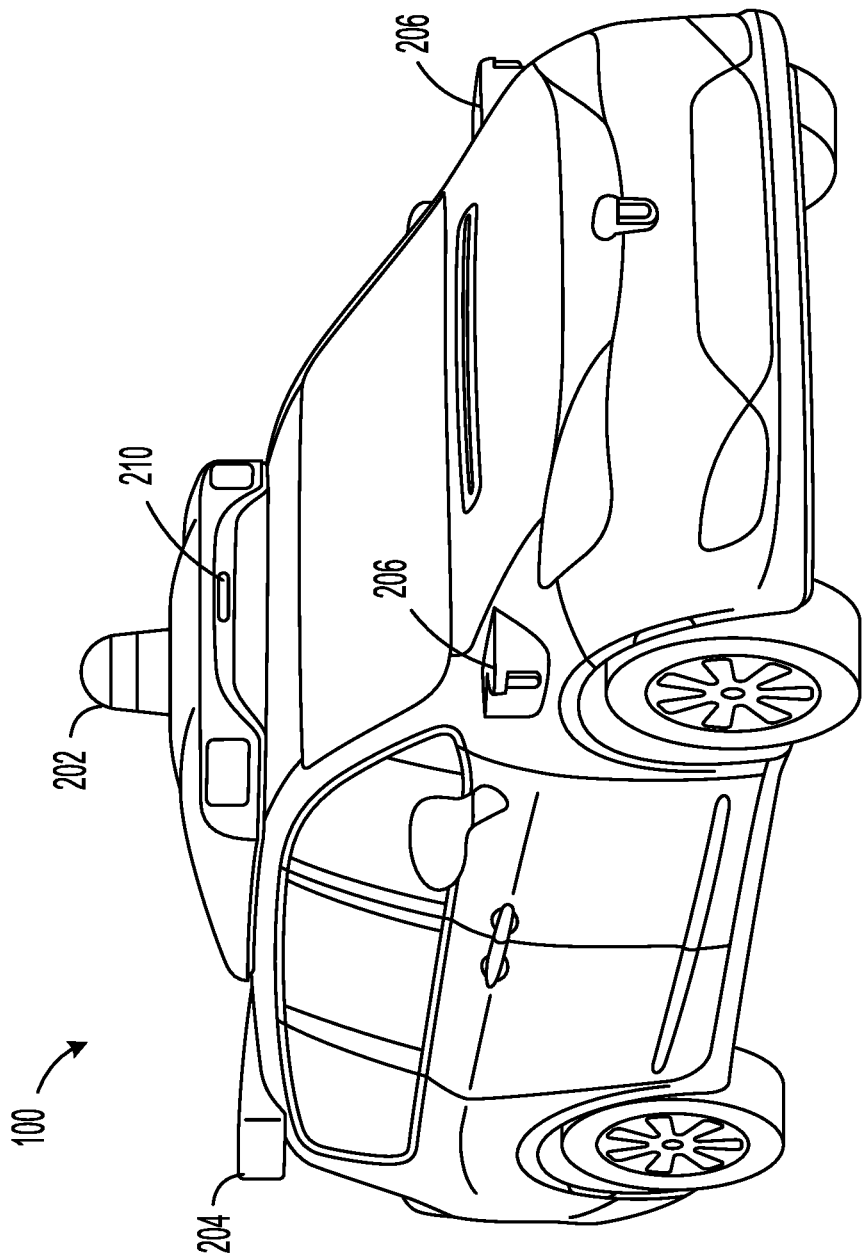
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system is used for detecting objects and estimating their positions by transmitting electromagnetic signals (radar signals) and analyzing the backscattered signals from the objects and other surfaces in the environment. The system can estimate a range for an object by transmitting short pulses and/or coded waveforms, such as a pulsed Doppler radar that involves a coherent burst of short pulses of a certain carrier frequency. In some applications, electromagnetic energy is concentrated to a particular spatial sector in the form of a beam via a parabolic reflector or an array of antenna elements associated with a radar unit.

A radar processing system (e.g., a computing device) may process radar data to generate two dimensional (2D) and/or three dimensional (3D) measurements that represent aspects of the environment, such as the positions, orientations, and movements of nearby objects and other surfaces occupying the environment near the radar system. Because a radar system can be used to measure distances and motions of nearby objects and other surfaces, vehicles are increasingly incorporating vehicle radar systems that can obtain and provide useful information for vehicle navigation, obstacle avoidance, and other vehicle operations that can boost overall vehicle safety. Radar can be used to detect and identify the positions, orientations, and movements of nearby vehicles, bicycles, pedestrians, and animals. In addition, radar can also reveal information about other features in the vehicle's surrounding environment, such as the location, arrangement, and position of road boundaries, road conditions (e.g., smooth or bumpy surfaces), weather conditions (e.g., wet or snowy roadways), and the relative positions of traffic signs and signals. As such, radar offers a way for vehicle systems to continuously monitor and understand changes during navigation in various environments and can supplement sensor data from other types of sensors.

In some applications, a vehicle radar system can provide information aimed to assist the vehicle's driver. For instance, radar measurements may be used to generate alerts when the vehicle drifts outside its lane, when the vehicle travels too closely to another vehicle or object, and/or in other ways that can help the driver safely control the vehicle. Radar measurements can also be used to help enable autonomous or semi-autonomous operations by the vehicle. In particular, radar data can be used by control systems to understand and safely navigate the vehicle's environment in near real-time as discussed above.

During navigation, adverse road conditions caused by rain, snow, puddles, etc. can impact performance of a vehicle. Precipitation on the road can be kicked up as road spray by vehicle wheels and can cause sensor degradation, such as aperture fouling. The road spray can deteriorate sensor performance with slow road spray accumulation being subtle and hard to detect. Thus, there exists a need to be able to detect adverse road conditions as a vehicle navigates.

Example embodiments presented herein relate to techniques for detecting adverse road conditions in real-time using radar. A vehicle radar system can be used to sense backscattered energy from rain and snow that enters into the field of view of one or more radar units positioned on the vehicle. For instance, a rear-mounted radar unit that is placed on the vehicle may detect rain and snow kicked up by the natural rotation of the vehicle's own tires. In some examples, the Doppler resolvability of road spray from the nearby ground clutter may be used to improve road spray detectability. As such, observation of the near-range response power may be used to detect road spray and puddles located on the road. A real-time detector may be constructed by measuring cumulative energy of spatial and/or velocity filters and comparing the energy to fair weather conditions.

Understanding the road conditions can enable a self-driving system to operate autonomously in adverse weather conditions. In particular, knowledge of adverse road conditions may be used to inform the vehicle's control system that it may suffer from reduced traction or may indicate that sensors are susceptible to the road spray from other vehicles in front of the vehicle. If the control system detects either of these conditions, the control system may adjust vehicle operations to increase response time and increase vehicle following distance. The control system may also apply brakes earlier in such conditions. In addition, location of puddles or other road precipitation may be used for route planning to identify areas where autonomous vehicles should avoid driving.

Some examples may involve direct measurement of road spray using automotive radar. For example, a computing device may detect the presence and amount of road spray based on the near-range, power-integrated, range-Doppler map and/or spatial cells where the road spray is expected that are compensated for background (e.g., no road-spray conditions). Integration of spatial filters in the range-angle space can be used to obtain high signal-to-noise (SNR) for imaging radars.

In addition, applications can stem from real-time knowledge of road spray. Road spray can cause sensor degradation (e.g., aperture fouling) and may cause the vehicle to have false positive object detections. As such, potential mitigation performed in response to adverse road conditions can include sensor cleaning and calibration, adjusting sensor detection thresholds, and increasing following distance relative to other vehicles to maintain a safe buffer given the road conditions.

Other mitigation techniques can also be performed. For instance, vehicles may share adverse road conditions in real-time, which can enable routes to be adjusted to avoid particular roads suffering from poor conditions (e.g., a flooded road). In some embodiments, maps that are used by vehicles for route planning and navigation can be updated based on detected adverse road conditions. As a result, vehicles can utilize maps to avoid potential conditions that have adverse conditions during route planning. In further examples, weather reports and trends can be leveraged to predict which roads may have adverse conditions at a given time. For instance, a road that typically floods during rainfall may be proactively avoided by vehicles based on weather reports (e.g., an hourly weather forecast) and/or upon detection of rainfall or another type of precipitation.

In some examples, for forward-facing radars, road spray from lead vehicles can cause increased kinematically consistent false detections, which may trigger false tracks in radar or other sensor pipelines (e.g., laser). In such examples, the sensed power from the rear radar road spray can be used to provide a consistent measure of the amount of road spray present on the road being traveled. The consistent measure of the amount of road spray can be used to adjust the constant false alarm rate (CFAR) detection threshold to reduce false alarm tracks. As a result, vehicle systems can continue navigation safely in a way that factors the road spray on the road without potential false tracks that can interfere with autonomous operations.

To further illustrate, an example technique may involve a computing device generating a background radar representation that represents a field of view for a radar unit during clear weather conditions. For instance, the background radar representation can represent clear weather conditions for a rear-facing radar unit that has a field of view that measures the environment located behind the vehicle. As such, the background radar representation can indicate measurements that the radar unit may likely obtain during clear weather conditions. For instance, clear weather conditions can represent dry conditions where precipitation (e.g., snow, rain) is not falling and not located on the ground as puddles forming a thin layer of water film. During clear weather conditions, the road may be clear and free from precipitation that the wheels could kick up into the field of view of a radar unit on the vehicle. As a result, the background radar representation would not include energy from detected road spray and can serve as a baseline (e.g., an energy level) that subsequent radar returns can be compared against to detect adverse road conditions.

The generation of the background radar representation can vary within example embodiments. For instance, a computing device may generate the background radar representation based on a series of radar measurements from the radar unit. These radar measurements may be obtained during navigation at different times, in various environments, and while the vehicle travels on different roads to obtain a diversity of radar measurements that can be used to generate a background radar representation that represents an average of the radar measurements. The various measurements may represent different environment conditions where the road is dry but other factors can differ. As a result, the background radar representation can represent an average energy level detected by the radar unit across its field of view when traveling on a road without adverse conditions. The computing device may filter measurements with energy levels that may indicate that the vehicle is traveling on an adverse road or detected a nearby object in order to generate the background radar representation as a clear condition representation of the field of view for the radar unit. In other examples, the computing device may receive the background representation from a remote computing system, such as a fleet management system that can calibrate and send background representations to multiple vehicles.

The adverse road condition detection technique may then involve using the generated background representation to detect adverse road conditions in real-time as these conditions arise during navigation of the vehicle. Particularly, the background representation can be stored and accessed from memory at any time that the vehicle is navigating and executes the adverse road condition detection technique. For instance, the system may periodically check the road conditions (e.g., every two minutes or 10 minutes of navigation) or may be configured to continuously monitor for adverse road conditions.

In some examples, to identify adverse road conditions in real-time, the computing device may compare radar returns to the background radar representation. The comparison can yield information that indicates when the radar unit is detecting road spray being kicked up by a wheel or multiple wheels, which could indicate that the vehicle is navigating on a wet road. The vehicle may then adjust operations to adapt to the wet road, which may involve increasing following space relative to other vehicles and making other adjustments (e.g., applying brakes earlier based on the wet road).

In some examples, the degree of adjustment can depend on the amount of road spray detected on the road. For instance, when techniques indicate a higher level of precipitation on the road, the vehicle may perform techniques designed for the high level of precipitation and these techniques can differ from those performed for a low level of precipitation on the road. Similarly, detection of rain or snow may also further contribute to additional adjustments by the vehicle control system.

A computing device may detect adverse road conditions using radar data in the form of two-dimensional (2D) radar images. In particular, the background radar representation and newly obtained radar measurements can take the form of 2D radar images that represent radar measurements (e.g., range and Doppler information). As such, radar images generated as the vehicle navigates a path on a road can be compared to the background radar representation to identify when road spray is being kicked up by vehicle wheels due to adverse road conditions.

For example, the energy from the background radar representation can be compared to the energy from a newly determined radar image generated as the vehicle navigates. When these energy levels differ, the computing device may use the difference to detect and quantify the road spray being kicked up by the vehicle wheels. For instance, when the difference is greater due to the radar image having more energy, this may indicate that more precipitation is located on the roads. The computing device may also factor other parameters, such as the vehicle current speed that can impact the amount of water being kicked up by the tires. In other embodiments, the radar representations can represent energy levels in another way, such as a numerical quantity that represents a total energy associated with measurements across the field of view for the radar unit.

In some examples, a vehicle system may maintain an average energy level for measurements from a radar unit during clear road conditions and generate a signal when detected energy from the radar increases above a threshold energy level. The increase in energy can indicate the presence of an object or road spray. The vehicle system may then differentiate between the object and road spray, which can involve using stored past energy returns from road spray or using additional measurements from the radar unit and/or another sensor (e.g., a camera).

In addition, a vehicle system may detect adverse road conditions based on road spray generated by other nearby vehicles. For instance, the vehicle system may perform a similar technique to detect energy measured from road spray generated by another vehicle traveling in front of the vehicle. In addition, the vehicle system may also share information regarding road conditions with other nearby vehicles. For instance, the vehicle system can send a map that indicates the presence of adverse road conditions to other vehicles located within a threshold geographic distance relative to the roads with the adverse road conditions. In some examples, adverse conditions may lead to vehicle systems performing radome cleaning techniques. For instance, a vehicle may cause radar radomes to apply heat to eliminate sleet or snow that may impact potential radar measurements. In other examples, a radome can use a wiper or an air-blower to help remove precipitation positioned on the radome.

The following detailed description may be used with one or more radar units having one or multiple antenna arrays. The one or multiple antenna arrays may take the form of a single-input single-output (SISO), single-input, multiple-output (SIMO), multiple-input single-output (MISO), multiple-input multiple-output (MIMO), and/or synthetic aperture radar (SAR) radar antenna architecture. In some embodiments, example radar unit architecture may include a plurality of "dual open-ended waveguide" (DOEWG) antennas. The term "DOEWG" may refer to a short section of a horizontal waveguide channel plus a vertical channel that splits into two parts. Each of the two parts of the vertical channel may include an output port configured to radiate at least a portion of electromagnetic waves that enters the radar unit. Additionally, in some instances, multiple DOEWG antennas may be arranged into one or more antenna arrays.

Some example radar systems may be configured to operate at an electromagnetic wave frequency in the W-Band (e.g., 77 Gigahertz (GHz)). The W-Band may correspond to electromagnetic waves on the order of millimeters (e.g., 1 mm or 4 mm). Such antennas may be compact (typically with rectangular form factors), efficient (i.e., with little of the 77 GHz energy lost to heat in the antenna or reflected back into the transmitter electronics), low cost and easy to manufacture (i.e., radar systems with these antennas can be made in high volume).

An antenna array may involve a set of multiple connected antennas that can work together as a single antenna to transmit or receive signals. By combining multiple radiating elements (i.e., antennas), an antenna array may enhance the performance of the radar unit when compared to radar units that use non-array antennas. In particular, a higher gain and narrower beam may be achieved when a radar unit is equipped with one or more antenna arrays. In some examples, a radar unit may include the same number of transmission antenna arrays and reception antenna arrays (e.g., four arrays of transmission antennas and four arrays of reception antennas). In other examples, a radar unit may include a number of transmission antenna arrays that differs from the number of reception antenna arrays (e.g., 6 transmission antenna arrays and 3 reception antenna arrays). In addition, some radar units may operate with parasitic arrays that can control radar transmissions. Other example radar units may include one or multiple driven arrays that have radiating elements connected to an energy source, which can have less overall energy loss when compared to parasitic arrays.

Antennas on a radar unit may be arranged in one or more linear antenna arrays (i.e., antennas within an array are aligned in a straight line). For instance, a radar unit may include multiple linear antenna arrays arranged in a particular configuration (e.g., in parallel lines on the radar unit). In other examples, antennas can also be arranged in planar arrays (i.e., antennas arranged in multiple, parallel lines on a single plane). Further, some radar units can have antennas arranged in multiple planes resulting in a three dimensional array. A radar unit may also include multiple types of arrays (e.g., a linear array on one portion and a planar array on another portion).

In addition, radar units may have different functionality and operational characteristics. For example, a radar unit may be configured for long-range operation and another radar unit may be configured for short-range operation. A radar system may use a combination of different radar units to measure different areas of the environment. Accordingly, it may be desirable for the signal processing of short-range radar units to be optimized for radar reflections in the near-field of the radar unit.

Referring now to the figures, FIG. 1 is a functional block diagram illustrating vehicle 100, which represents a vehicle capable of operating fully or partially in an autonomous mode. More specifically, vehicle 100 may operate in an autonomous mode without human interaction through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some example embodiments, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or secure wireless connections). In other examples, vehicle 100 may include more or fewer subsystems. In addition, the functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel.

Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 further includes power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radar units, LIDAR units, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
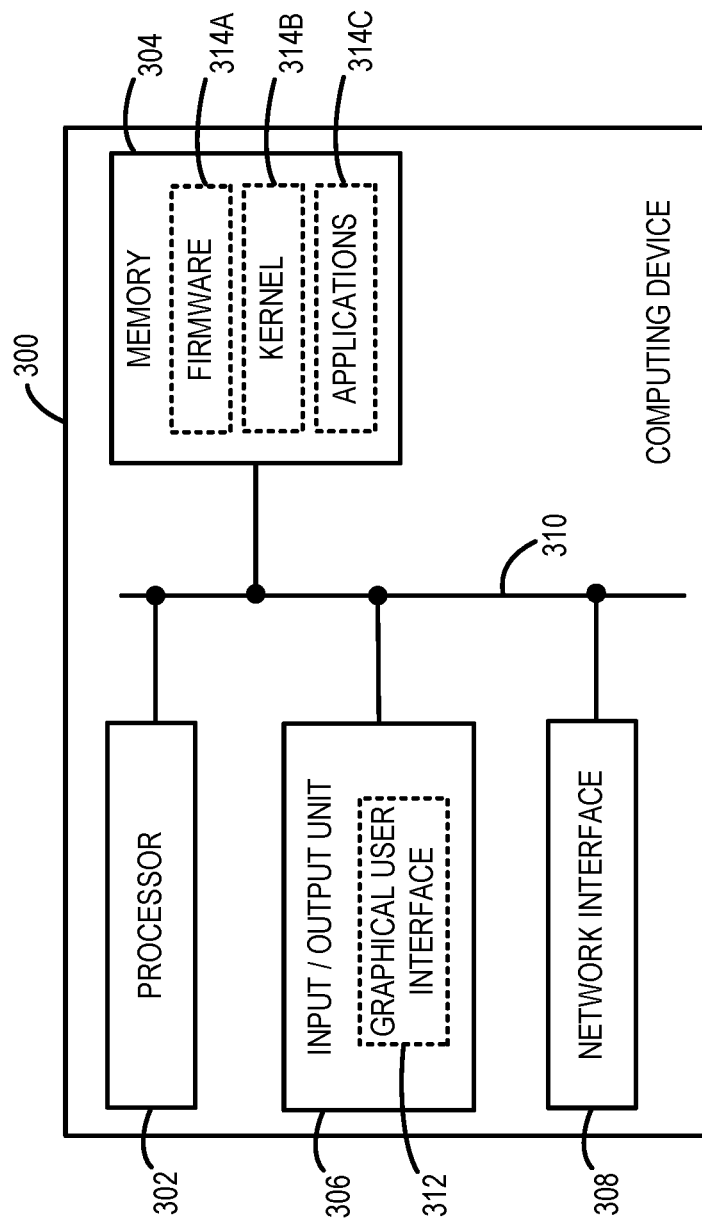
FIG. 3 is a simplified block diagram for a computing system, according to one or more example embodiments.

FIG. 3 is a simplified block diagram exemplifying computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104, develop control instructions, enable wireless communication with other devices, and/or perform other operations. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processor 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processor 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 302 may be one or more single-core processors. In other cases, processor 302 may be one or more multi-core processors with multiple independent processing units. Processor 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples. Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processor 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more user-space software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may be displayable one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including adverse road conditions detection techniques using radar or another type of sensor data.

Figure 4:
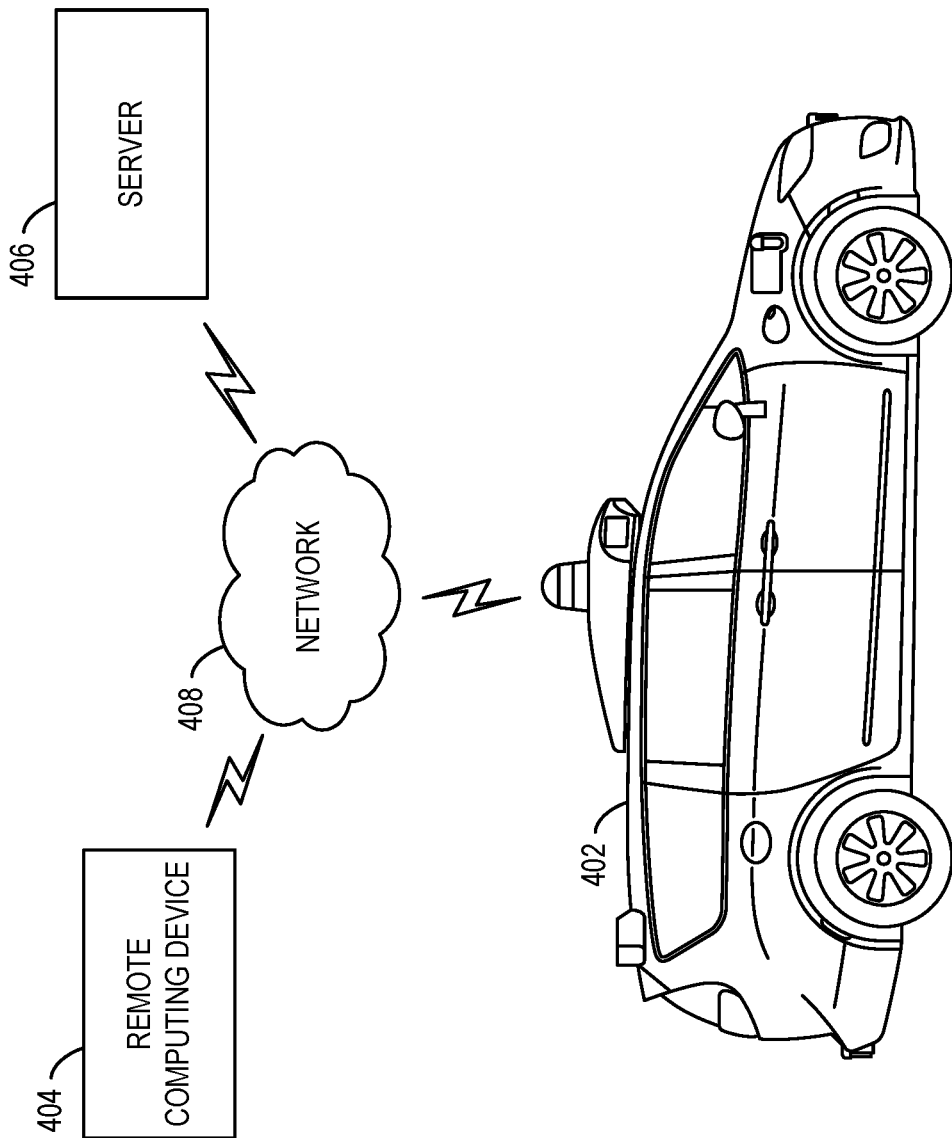
FIG. 4 is a system for wireless communication between a vehicle and computing devices, according to one or more example embodiments.

FIG. 4 is a system for wireless communication between computing devices and a vehicle, according to one or more example embodiments. Particularly, system 400 is shown with vehicle 402, remote computing device 404, and server 406 communicating wirelessly via network 408. System 400 may include other components not shown within other embodiments, such as firewalls and multiple networks, among others.

Vehicle 402 may be configured to autonomously (or semi-autonomously) transport passengers or objects (e.g., cargo) between locations and may take the form of any one or more of the vehicles discussed above, including passenger vehicles, cargo shipping vehicles (e.g., trucks), farming and manufacturing vehicles, and dual-purpose vehicles. When operating in autonomous mode, vehicle 402 may navigate to pick up and drop off passengers (or cargo) between desired destinations by relying on sensor measurements to detect and understand the surrounding environment. In some embodiments, vehicle 402 can operate as part of a fleet, which may be managed by a central system (e.g., remote computing device 404 and/or other computing devices).

Remote computing device 404 may represent any type of device or devices configured to perform operations, including but not limited to those described herein. The position of remote computing device 404 relative to vehicle 402 can vary within examples. For instance, remote computing device 404 may have a remote position from vehicle 402, such as operating inside a physical building. In some implementations, operations described herein that are performed by remote computing device 404 may be additionally or alternatively performed by vehicle 402 (i.e., by any system(s) or subsystem(s) of vehicle 200).

In addition, operations described herein can be performed by any of the components communicating via network 408. For instance, remote computing device 404 may determine a route and/or operations for vehicle 402 to execute using information from vehicle 402 and/or other external sources (e.g., server 406). In some embodiments, remote computing device 404 may generate a GUI to display one or more selectable options for review by a remote operator.

Server 406 may be configured to wirelessly communicate with remote computing device 404 and vehicle 402 via network 408 (or perhaps directly with remote computing device 404 and/or vehicle 402). As such, server 406 may represent any computing device configured to receive, store, determine, and/or send information relating to vehicle 402 and the remote assistance thereof. Server 406 may be configured to perform any operation(s), or portions of such operation(s), that is/are described herein as performed by remote computing device 404 and/or vehicle 402. Some implementations of wireless communication related to remote assistance may utilize server 406, while others may not.

Network 408 represents infrastructure that can enable wireless communication between computing devices, such as vehicle 402, remote computing device 404, and server 406. For example, network 408 can correspond to a wireless communication network, such as the Internet or a cellular wireless communication network. The various systems described above may perform various operations. These operations and related features will now be described.

In some embodiments, vehicle 402 may communicate with remote computing device 404 and/or server 406 via network 408 to receive and/or provide information related to adverse road condition detection techniques described herein. For example, vehicle 402 may communicate adverse road conditions detected during navigation to server 406 for storage and subsequent access by other vehicles. Vehicle 402 may also communicate information related to adverse road conditions directly with other vehicles. For instance, vehicle 402 can be part of a convoy with other vehicles and share information related to road conditions with other vehicles within the convoy.

FIG. 5A illustrates a wheel generating road spray during forward motion, according to one or more example embodiments. Scenario 500 is a simplified representation that shows wheel 502 traveling forward at velocity 510 with rotation rate 512 on road 508. As wheel 502 rotates, wheel 502 can cause precipitation (shown as water layer 506) to spray off road 508 in the form of road spray 504. As such, elements shown in scenario 500 can differ from the configuration shown in FIG. 5A.

Wheel 502 represents any type of tire or wheel that a vehicle may use for navigation. For example, wheel 502 can be positioned on a car, a van, a truck, a bus, a motorcycle and/or another type of vehicle. As wheel 502 travels forward, the rotation of wheel 502 can cause water from water layer 506 to kick up and form road spray 504. The size, distance away from wheel 502, and shape of road spray 504 can vary based on various factors, such as the amount of weight on wheel 502, rotation rate 512, and velocity 510. In addition, the configuration and depth of water layer 506 can also impact road spray 504. In some examples, water layer 506 can be snow or slush that also impacts road spray 504.

FIG. 5B shows a side view of a vehicle using a rear-facing radar unit to detect road spray, according to one or more example embodiments. In the example embodiment, scenario 520 shows vehicle 522 navigating a forward path on road 524 at velocity 526, which causes a portion of water layer 534 positioned on road 524 to spray behind vehicle 522 in the form of road spray 532. As a result, vehicle 522 can perform an example technique using radar unit 528 to detect the adverse road condition of road 524. In other example embodiments, components shown in FIG. 5B can differ. For instance, radar unit 528 can have a different position on vehicle 522 in another example implementation.

Radar unit 528 is shown in a rear-facing configuration and coupled to a rear exterior portion relative to a back bumper on vehicle 522. At this position, radar unit 528 operates with field of view 530 extending behind vehicle 522. Field of view 530 represents elevation, range, and azimuth coverage for radar unit 528. As such, radar unit 528 can transmit radar beams in the reverse direction of vehicle 522 to increase selectivity and gain in the direction of road spray 532.

As such, road spray 532 can be physically kicked up into line-of-sight of radar unit 528 enabling radar unit 528 to sense road spray 532. For instance, road spray 532 may have a trail that extends approximately 12 meters behind vehicle 522. The trail can remain contained in the lane of vehicle 522 and may have dimensions that differ from vehicles entering into this region relative to vehicle 522 reducing false positives.

Radio frequency (RF) backscattering off rain, snow, and road spray in the atmosphere can be sensed by radar unit 528. The effect from road spray 532 can produce elevated response power in, for example, the range-Doppler bin where the droplets reside in the range-Doppler map. In addition, radar unit 528 may detect elevated response power spatially localized where there is a high concentration of road spray 532. In some examples, the computing device may use a power detector to detect road spray 532.

Similar to road spray 504 shown in FIG. 5A, road spray 532 can differ during navigation of vehicle 522 based on various factors. Example factors may include one or more vehicle-based parameters, such as a weight of vehicle 522, size and configuration of tires on vehicle 522, and velocity 526 that vehicle 522 is traveling. Environment-based parameters can also impact road spray 504, such as condition of road 524 (e.g., puddles), and depth and consistency of water layer 534 (e.g., water puddles or sleet), among others. In addition, road spray 504 can fluctuate as vehicle 522 navigates a path forward since the depth and accumulation of water layer 534 can vary. For instance, some portions of road 524 may be formed in a way that enables water to accumulate, which can produce more road spray 504 when vehicle 522 drives over these portions.

FIG. 5C illustrates a top view of a vehicle using a rear-facing radar unit to detect road spray, according to one or more example embodiments. In the example embodiment, scenario 540 shows a top view of vehicle 522 using radar unit 528 to detect both road spray 532A and road spray 532B. At the center position on vehicle 522, radar unit 528 operates using field of view 530. When vehicle 522 is navigating a road with adverse conditions (e.g., during rain or snowfall), the back wheels may kick up water on the road and form road spray 532A and road spray 532B, respectively. A computing device may use radar measurements from radar unit 528 to detect road spray 532A and road spray 532B and determine that vehicle 522 is currently navigating on a road with adverse conditions. The computing device may perform one or more techniques described herein.

FIG. 5D illustrates a top view of a vehicle using multiple radar units to detect road spray, according to one or more example embodiments. In the example embodiment, scenario 550 shows vehicle 522 equipped with multiple rear-facing radar unit 528A and radar unit 528B. Radar unit 528A operates using field of view 530A and radar unit 528B operates using field of view 530B. A computing device may use detections of radar spray 532A by radar unit 528A and road spray 532B by radar unit 528B to identify adverse conditions. In some examples, one of radar unit 528A or radar unit 528B may detect road spray, which may indicate that only a portion of the road has precipitation accumulated on it, such as near a curb or another road boundary. As a result, the computing device may cause vehicle 522 to modify its position within the lane to move away from the precipitation and/or adjust lanes to navigate in a different lane with road conditions more suitable for navigation (e.g., a center lane positioned further from the drain system on the side of the road).

Figure 6:
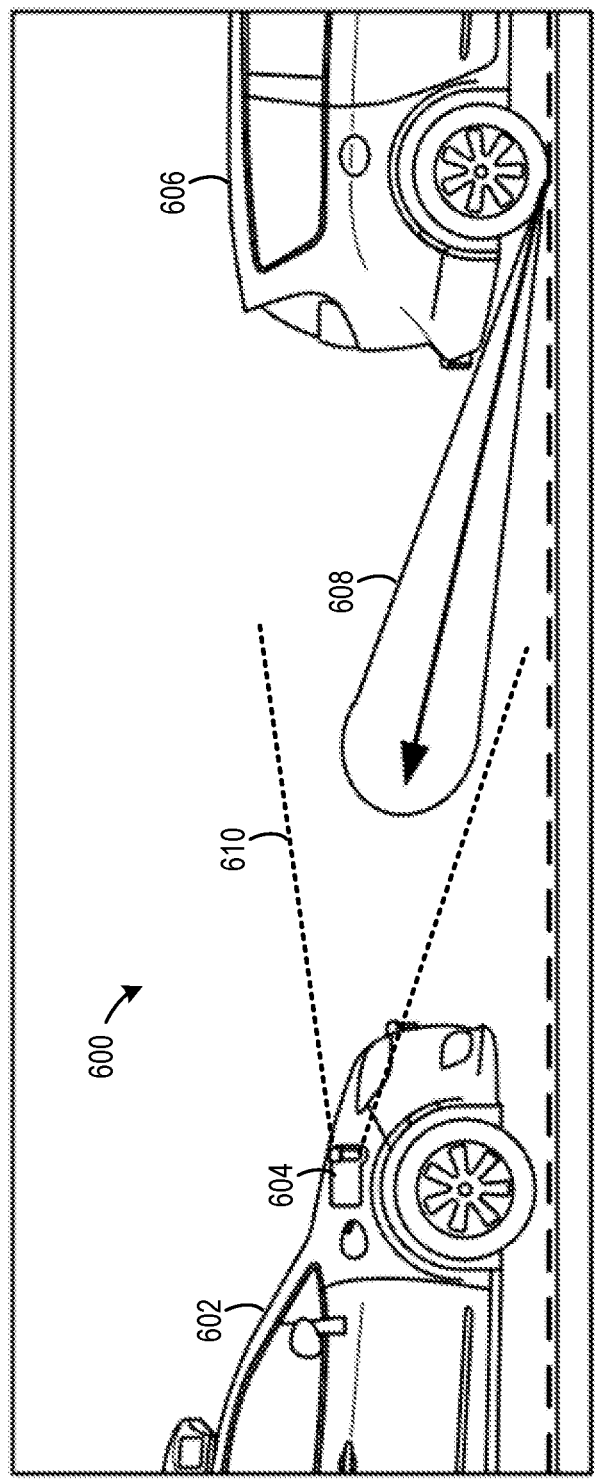
FIG. 6 illustrates a vehicle using front-facing radar to detect road spray caused by another vehicle, according to one or more example embodiments.

FIG. 6 illustrates a vehicle using front-facing radar to detect road spray, according to one or more example embodiments. In the example embodiment, scenario 600 shows vehicle 602 using forward-facing radar unit 604 to detect road spray 608 kicked up by vehicle 606 during forward navigation.

As vehicle 602 travels a forward path, a control system may use sensor data to detect and understand the surrounding environment. The vehicle sensor systems can include a radar system, which may include one or more radar units (e.g., radar unit 604) positioned relative to the front of vehicle 602 in order to measure a forward environment. Radar unit 604 represents any type of radar unit within a vehicle radar system. Radar unit 604 is positioned near the front of vehicle 602 and oriented to have field of view 610, which captures measurements of a forward environment of vehicle 602. Radar unit 604 may detect objects, such as other vehicles, signs, lane markers, and road boundaries.

In some instances, radar unit 604 may capture measurements of road spray that originated from the wheels of other vehicles. To illustrate, scenario 600 shows the back wheels of vehicle 606 causing a thin layer of water on the road to kick up as road spray 608 that sprays behind vehicle 606. A high level of road spray 608 may enter into field of view 610 of radar unit 604 if vehicle 602 is traveling close enough to vehicle 606. As such, vehicle systems can perform operations disclosed herein to detect and quantify a level of road spray present on the path and responsively adjust operations. Adjusting operations may involve changing lanes, adjusting speeds and following distances, modifying routes, and/or other potential mitigation techniques. In some embodiments, vehicle 606 and vehicle 602 may share information related to detected adverse conditions. For instance, vehicle 606 can be operating as a lead in a convoy that includes vehicle 602 and may share detected adverse road conditions.

Figure 7:
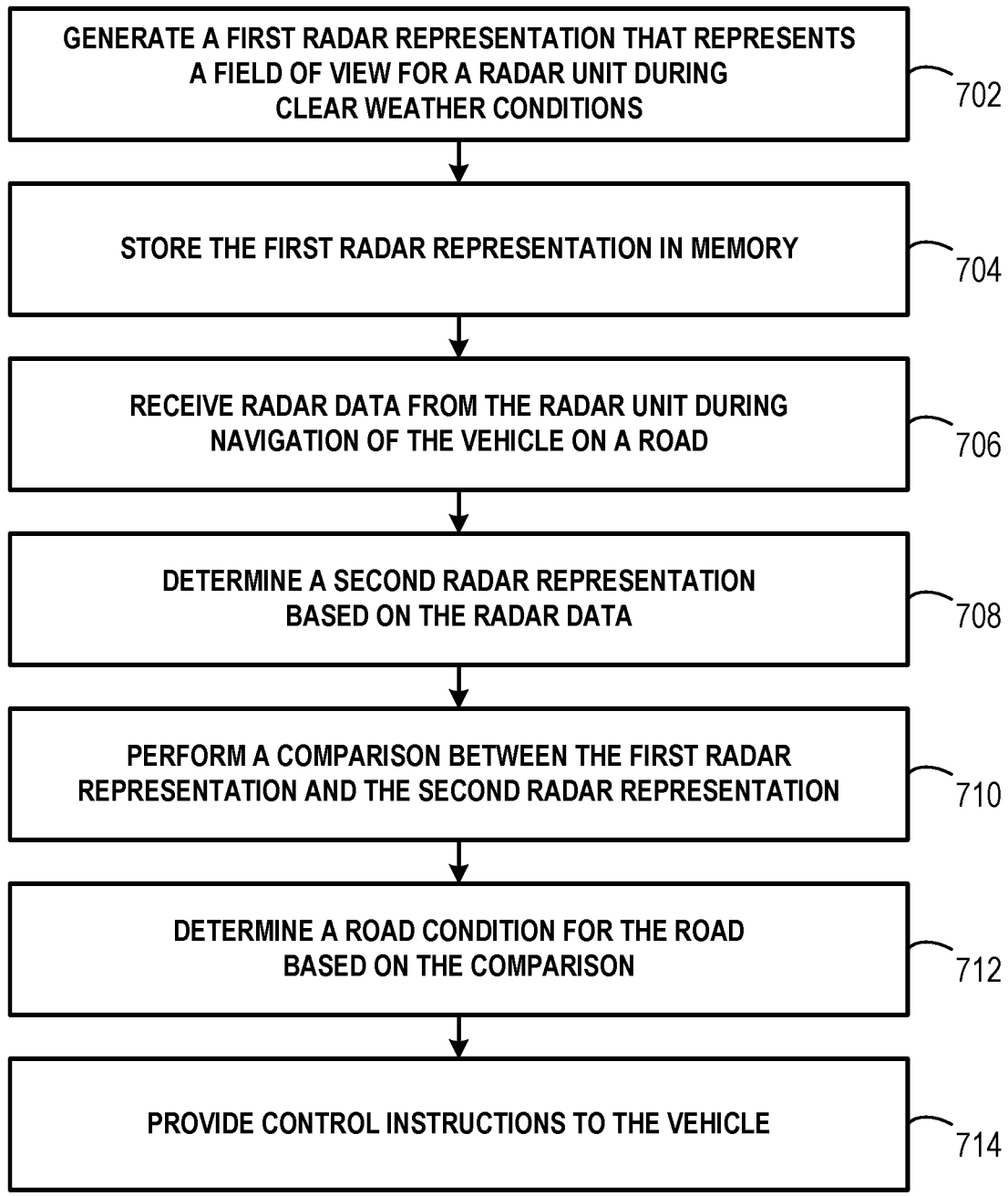
FIG. 7 is a flow chart of a method for detecting adverse road conditions in real-time using radar, according to one or more example embodiments.

FIG. 7 is a flow chart of a method for detecting adverse road conditions in real-time using radar, according to one or more example embodiments. Method 700 may include one or more operations, functions, or actions, as depicted by one or more of blocks 702, 704, 706, 708, 710, 712, and 714 each of which may be carried out by any of the systems shown in prior figures, among other possible systems.

Those skilled in the art will understand that the flow charts described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 702, method 700 involves generating a first radar representation that represents a field of view for a radar unit during clear weather conditions. For example, a computing device may generate a first radar image representing range and Doppler information for the field of view of the radar unit during clear weather conditions.

The radar unit can be part of a vehicle radar system. For instance, the radar unit can be a rear-facing radar unit coupled to the vehicle such that the field of view covers a portion of a rear environment of the vehicle.

In some examples, a computing device may generate the first radar representation may involve receiving a plurality of radar data sets from the radar unit during navigation of the vehicle in a plurality of environments and determine an energy level for each radar data set from the plurality of radar data sets. The computing device may further determine an average energy level based on a plurality of energy levels corresponding to the plurality of radar data sets and generate the first radar representation based on the average energy level.

In some instances, the computing device may remove one or more radar data sets having a given energy level that exceeds a threshold energy level based on determining the energy level for each radar data set. The threshold energy level can be based on a particular energy level associated with detection of an object. Such a detection can produce high radar returns that exceed the threshold energy level and can make detecting road spray difficult. As such, these data sets can be removed and additional sets can be used to detect road spray. In some examples, the computing device may then determine the average energy level based on removing the one or more radar data sets. The average energy level can then be determined across sets of radar data measurements that do not have high power returns caused by objects detected nearby the vehicle.

At block 704, method 700 involves storing the first radar representation in memory. The computing device may store the first radar representation in local memory positioned onboard the vehicle. In other examples, the computing device may store the first radar representation remotely. Storing the first radar representation can involve different types of storage technologies and can also involve multiple copies of the first radar representation being stored.

At block 706, method 700 involves receiving radar data from the radar unit during navigation of the vehicle on a road. The vehicle radar system may accumulate radar measurements as the vehicle navigates paths on various types of roads and paths. In some cases, multiple radar units can capture measurements of the environment surrounding the vehicle.

At block 708, method 700 involves determining a second radar representation based on the radar data. For example, the computing device may determine a second radar image representing range and Doppler information for the field of view of the radar unit based on the radar data. Some examples may involve using 2D range azimuth images obtained via the radar data. In addition, some embodiments involve processing radar returns in radar data cube forms. Particularly, power levels represented by voxels within radar data cubes can be used to detect levels that may indicate the presence of road spray.

At block 710, method 700 involves performing a comparison between the first radar representation and the second radar representation. For instance, a computing device may perform the comparison between a first energy from the first radar representation and a second energy from the second radar representation. The computing device may determine that the second energy from the second radar representation is at least a threshold energy level greater than the first energy from the first radar representation based on the comparison. In some examples, a computing device may filter the first energy from the first radar representation from the second energy from the second radar representation.

At block 712, method 700 involves determining a road condition for the road based on the comparison. The road condition can indicate a quantity of precipitation located on the road. In some examples, the computing device may determine the road condition for the road based on determining that second energy from the second radar representation is at least the threshold energy level greater than the first energy from the first radar representation. In some examples, the computing device may factor other parameters when determining the road condition. For instance, the computing device may factor maps that represent road conditions from other vehicles, weather forecasts, and/or other sensor measurements.

At block 714, method 700 involves providing control instructions to the vehicle. For example, the computing device may determine that the quantity of precipitation exceeds a threshold precipitation level and responsively adjust a path of the vehicle based on determining that the quantity of precipitation exceeds the threshold precipitation level. This may involve adjusting a lane of travel of the vehicle or shifting the vehicle toward a side of the lane, among other potential operations.

In some examples, the computing device may adjust thresholds associated with one or more sensors based on detecting road spray. For instance, when the sensed power from the rear radar road spray detector exceeds a nominal value, the detection threshold over some number of near-range bins may be adjusted to reduce false alarm tracks that are generated by road spray in close proximity to the vehicle.

In some examples, method 700 may further involve modifying a map based on the road condition of the road. Based on modifying the map, the computing device may provide the modified map to at least a remote computing device. For instance, the remote computing device may be configured to provide the modified map to one or more additional vehicles navigating a path that involves using the road.

In some examples, a computing device may receive first radar data from a first radar unit and second radar data from a second radar unit during navigation of the vehicle. The first radar unit and the second radar unit may be rear-facing radar units configured to measure respective portions of an environment located behind the vehicle. As such the computing device may determine the second radar representation based on the first radar data and a third radar representation based on the second radar data. As a result, the computing device may also perform a first comparison between the first radar representation and the second radar representation and perform a second comparison between the first radar representation and the third radar representation. The computing device may determine the road condition for the road based on both the first comparison and the second comparison. For instance, the computing device may determine that a layer of precipitation is located on a portion of the road positioned proximate to a road boundary (e.g., along a drain path positioned by a curb). The computing device may cause the vehicle to shift position on the road away from the layer of precipitation that is located on the portion of the road positioned proximate to the road boundary.

In some embodiments, other types of sensors may be used. For instance, a computing device may use LIDAR to detect road spray. The position and operation of radar units may increase accuracy with detecting road spray. In addition, the computing device may also update and share a map that conveys adverse road conditions with other vehicles positioned at a threshold distance from the vehicle and/or road with adverse road conditions (e.g., within 2 miles from the vehicle and/or the road with adverse conditions).

In some examples, one or more power ranges can be used to represent power returns obtained when adverse road conditions are present. For instance, when current radar returns for a radar unit displays power detections that fall within a power range associated with adverse road conditions, vehicle systems may determine that current road conditions are adverse and modify control of the vehicle to accommodate these conditions. In addition, when using the power range(s), power returns caused by a reflective object may exceed the power range(s) associated with adverse road conditions.

In some examples trends can be determined overtime by accumulating adverse road conditions from multiple vehicles for a general location (e.g., a city or town) or a particular stretch of road (e.g., a highway). These trends showing which roadways experience more adverse conditions can help indicate which roads may be vulnerable to adverse conditions for various reasons. In some examples, the trends can help with the repair of the roads that tend to be vulnerable to sitting water more than other roads positioned nearby.

Figure 8:
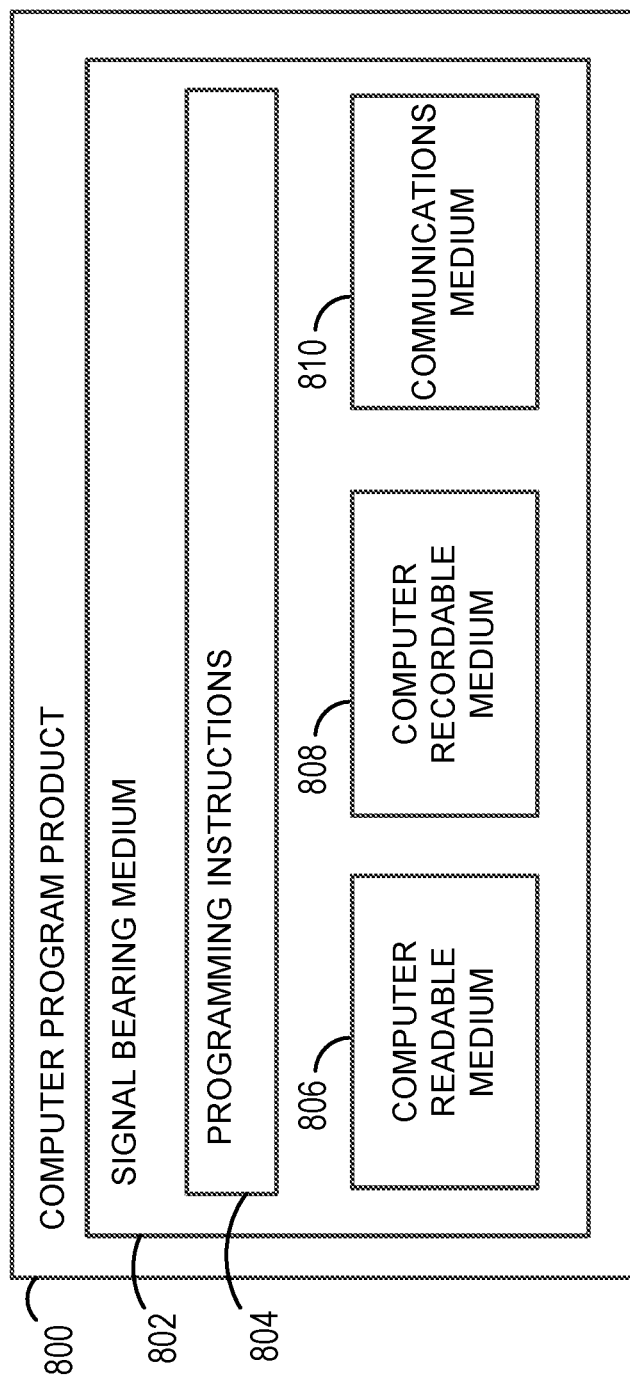
FIG. 8 is a schematic diagram of a computer program, according to one or more example embodiments.

FIG. 8 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 800 is provided using signal bearing medium 802, which may include one or more programming instructions 804 that, when executed by one or more processors may provide functionality or portions of the functionality described above with respect to FIGS. 1-7. In some examples, the signal bearing medium 802 may encompass a non-transitory computer-readable medium 806, such as, but not limited to, a hard disk drive, a Compact Disc (CD), a Digital Video Disk (DVD), a digital tape, memory, etc. In some implementations, the signal bearing medium 802 may encompass a computer recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, the signal bearing medium 802 may be conveyed by a wireless form of the communications medium 810.

The one or more programming instructions 804 may be, for example, computer executable and/or logic implemented instructions. In some examples, a computing device such as the computer system 112 of FIG. 1 may be configured to provide various operations, functions, or actions in response to the programming instructions 804 conveyed to the computer system 112 by one or more of the computer readable medium 806, the computer recordable medium 808, and/or the communications medium 810. Other devices may perform operations, functions, or actions described herein.

The non-transitory computer readable medium could also be distributed among multiple data storage elements, which could be remotely located from each other. The computing device that executes some or all of the stored instructions could be a vehicle, such as vehicle 100 illustrated in FIGS. 1-2E. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
   generating, at a computing device coupled to a vehicle, a first radar representation that represents a field of view for a radar unit based on first radar data obtained by the radar unit during navigation by the vehicle on at least a first road in clear weather conditions, wherein the radar unit is coupled to an external surface of the vehicle, is rear-facing and is positioned such that the radar unit is able to detect precipitation kicked up by one or more wheels of the vehicle;
   storing the first radar representation in memory;
   receiving, at the computing device, second radar data from the radar unit during subsequent navigation by the vehicle on a second road;
   determining, by the computing device, a second radar representation based on the radar data;
   performing, by the computing device, a comparison between the first radar representation and the second radar representation, wherein the computing device obtains the first radar representation from the memory to perform the comparison;
   based on the comparison, determining whether precipitation is being kicked up by one or more wheels of the vehicle and thereby determining a road condition for the second road, wherein the road condition represents a quantity of precipitation located on the second road; and
   based on the road condition for the second road, adjusting, by the computing device, a constant false alarm rate (CFAR) detection threshold used when processing radar data received from a forward-facing radar unit coupled to the vehicle and a speed and following distance maintained by the vehicle when another vehicle is traveling in front of the vehicle on the second road.

2. The method of claim 1, wherein generating the first radar representation comprises:
   receiving a plurality of radar data sets from the radar unit during navigation of the vehicle in a plurality of environments;
   determining an energy level for each radar data set from the plurality of radar data sets;

determining an average energy level based on a plurality of energy levels corresponding to the plurality of radar data sets; and
generating the first radar representation based on the average energy level.

3. The method of claim 2, further comprising:
based on determining the energy level for each radar data set, removing one or more radar data sets having a given energy level that exceeds a threshold energy level, wherein the threshold energy level is based on a particular energy level associated with detection of an object; and
wherein determining the average energy level comprises:
determining the average energy level based on removing the one or more radar data sets.

4. The method of claim 1, wherein generating the first radar representation comprises:
generating a first radar image representing range and Doppler information for the field of view of the radar unit during clear weather conditions.

5. The method of claim 4, wherein determining the second radar representation based on the radar data comprises:
determining a second radar image representing range and Doppler information for the field of view of the radar unit based on the radar data.

6. The method of claim 5, wherein performing the comparison between the first radar representation and the second radar representation comprises:
performing the comparison between a first energy from the first radar representation and a second energy from the second radar representation; and
based on the comparison, determining that the second energy from the second radar representation is at least a threshold energy level greater than the first energy from the first radar representation.

7. The method of claim 6, wherein performing the comparison between the first energy from the first radar representation and the second energy from the second radar representation comprises:
filtering the first energy from the first radar representation and the second energy from the second radar representation; and
wherein determining the road condition for the second road comprises:
determining the road condition for the second road based on determining that second energy from the second radar representation is at least the threshold energy level greater than the first energy from the first radar representation.

8. The method of claim 1, wherein the field of view of the radar unit covers a portion of a rear environment of the vehicle.

9. The method of claim 1, wherein storing the first radar representation in memory comprises:
storing the first radar representation in local memory positioned on the vehicle.

10. The method of claim 1, wherein providing control instructions to the vehicle comprises:
determining that the quantity of precipitation exceeds a threshold precipitation level; and
adjusting a path of the vehicle based on determining that the quantity of precipitation exceeds the threshold precipitation level.

11. The method of claim 10, wherein adjusting the path of the vehicle comprises:
adjusting a lane of travel of the vehicle.

12. The method of claim 1, further comprising:
modifying a map based on the road condition of the second road; and
providing the modified map to at least a remote computing device, wherein the remote computing device is configured to provide the modified map to one or more additional vehicles navigating a path that comprises the second road.

13. The method of claim 1, wherein receiving second radar data from the radar unit during subsequent navigation by the vehicle on the second road comprises:
receiving first additional radar data from a first radar unit and second additional radar data from a second radar unit during subsequent navigation by the vehicle, wherein the first radar unit and the second radar unit are rear-facing radar units configured to measure respective portions of an environment located behind the vehicle;
determining the second radar representation based on the first additional radar data and a third radar representation determined based on the second additional radar data; and
wherein performing the comparison between the first radar representation and the second radar representation comprises:
performing a first comparison between the first radar representation and the second radar representation; and
performing a second comparison between the first radar representation and the third radar representation.

14. The method of claim 13, wherein determining the road condition for the second road comprises:
determining the road condition for the second road based on both the first comparison and the second comparison.

15. The method of claim 14, wherein determining the road condition for the second road based on both the first comparison and the second comparison comprises:
determining that a layer of precipitation is located on a portion of the second road positioned proximate to a road boundary; and
wherein providing control instructions to the vehicle comprises:
causing the vehicle to shift position on the second road away from the layer of precipitation that is located on the portion of the second road positioned proximate to the road boundary.

16. The method of claim 1, further comprising:
adjusting a power level of the radar unit based on the road condition for the second road.

17. A system comprising:
a radar unit coupled to a vehicle, wherein the radar unit is rear-facing and positioned such that the radar unit is able to detect precipitation kicked up by one or more wheels of the vehicle; and
a computing device configured to:
generate a first radar representation that represents a field of view for the radar unit based on first radar data obtained by the radar unit during navigation by the vehicle on at least a first road in clear weather conditions;
store the first radar representation in memory;
receive second radar data from the radar unit during subsequent navigation by the vehicle on a second road;
determine a second radar representation based on the radar data;
perform a comparison between the first radar representation and the second radar representation, wherein the computing device obtains the first radar representation from the memory to perform the comparison;

based on the comparison, determine whether precipitation is being kicked up by one or more wheels of the vehicle and thereby determining a road condition for the second road, wherein the road condition represents a quantity of precipitation located on the second road; and based on the road condition for the second road, adjust a constant false alarm rate (CFAR) detection threshold used when processing radar data received from a forward-facing radar unit coupled to the vehicle and a speed and following distance maintained by the vehicle when another vehicle is traveling in front of the vehicle on the second road.

18. The system of claim 17, wherein the computing device is further configured to:

determine the road condition for the second road further based on a speed of the vehicle.

19. The system of claim 17, wherein the computing device is further configured to:

update a map to include an indication that represents the road condition for the second road; and transmit the map to one or more vehicles having a given location within a threshold distance from the second road.

20. A non-transitory computer-readable medium configured to store instructions, that when executed by a computing system comprising one or more processors, causes the computing system to perform operations comprising:

generating a first radar representation that represents a field of view for a radar unit based on first radar data obtained by the radar unit during navigation by the vehicle on at least a first road in clear weather conditions, wherein the radar unit is coupled to an external surface of the vehicle, is rear-facing and is positioned such that the radar unit is able to detect precipitation kicked up by one or more wheels of the vehicle;

storing the first radar representation in memory;

receiving second radar data from the radar unit during subsequent navigation by the vehicle on a second road;

determining a second radar representation based on the radar data;

performing a comparison between the first radar representation and the second radar representation, wherein the first radar representation is obtained from the memory to perform the comparison;

based on the comparison, determining whether precipitation is being kicked up by one or more wheels of the vehicle and thereby determining a road condition for the second road, wherein the road condition represents a quantity of precipitation located on the second road; and based on the road condition for the second road, adjusting a constant false alarm rate (CFAR) detection threshold used when processing radar data received from a forward-facing radar unit coupled to the vehicle and a speed and following distance maintained by the vehicle when another vehicle is traveling in front of the vehicle on the second road.

* * * * *